Figure 1:
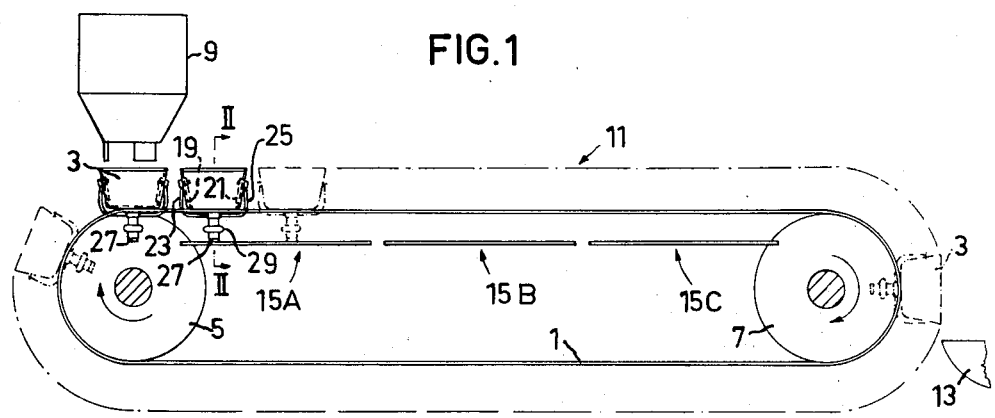

United States Patent [19]

Vigerström

[11] 3,996,385

[45] Dec. 7, 1976

[54] METHOD AND DEVICE FOR PREPARING FOODSTUFFS WITH DIRECT PASSAGE OF ELECTRIC CURRENT

[75] Inventor: Knut Birger Vigerström, Stockholm, Sweden

[73] Assignee: Electro-Food AB, Stockholm, Sweden

[22] Filed: Aug. 19, 1974

[21] Appl. No.: 498,859

Related U.S. Application Data

[63] Continuation of Ser. No. 174,475, Aug. 24, 1971, abandoned.

[30] Foreign Application Priority Data

Aug. 24, 1970 Sweden ............................ 11461/70

[52] U.S. Cl. ............................... 426/244; 426/509
[51] Int. Cl.² ...................... A23L 1/216; H05B 3/14
[58] Field of Search .......... 426/237, 243, 509, 241, 426/244, 246, 247, 245, 523; 99/358; 219/284, 288, 289, 295

[56] References Cited

UNITED STATES PATENTS

| | | | |
|---|---|---|---|
| 2,299,088 | 10/1942 | Griffith | 219/19 |
| 2,970,916 | 2/1961 | Harper | 426/523 |
| 3,547,657 | 12/1970 | Otsuka | 426/246 |
| 3,651,753 | 3/1972 | Schmidt | 99/358 |
| 3,862,344 | 1/1975 | Zobel | 426/244 |

FOREIGN PATENTS OR APPLICATIONS 835,984  6/1960  United Kingdom

*Primary Examiner*—Hiram H. Bernstein
*Attorney, Agent, or Firm*—Cushman, Darby & Cushman

[57] ABSTRACT

The present invention relates to a method and device for the processing of organic substances, particularly the preparation of comestibles such as potatoes, with direct passage of electric current in an electrolyte. The method is distinguished in that the electric characteristics of the current passage processing, e.g. the voltage applied, are varied during the processing period and that the processing is divided into a number of stages with mutually dissimilar electric characteristics. The device is chiefly characterized by transporting means which convey a plurality of vessels filled with electrolyte and the substance to be treated, a filling station for filling said vessels with electrolyte and the substance to be processed, a processing path along which the transporting means convey the vessels and where said vessels are subjected to processing, current supply means which are electrically connectable with the electrolyte in the vessels on the processing path and control means which vary the electric characteristics of the current passage processing for each vessel while said vessel is moving along said processing path. In a further method, the applied voltage to the electrodes is intermittently interrupted and the electrodes for a continuous processing machine may be subdivided, the sections being alternately connected with the current supply in such a manner that all sections are never simultaneously connected to the current supply.

12 Claims, 4 Drawing Figures

U.S. Patent  Dec. 7, 1976  Sheet 1 of 2  3,996,385

INVENTOR.
KNUT BIRGER VIGERSTROM
BY
Cushman, Darby & Cushman

METHOD AND DEVICE FOR PREPARING FOODSTUFFS WITH DIRECT PASSAGE OF ELECTRIC CURRENT

This is a continuation of application Ser. No. 174,475 filed Aug. 24, 1971 and now abandoned.

The present invention relates to the processing of organic substances, particularly the preparation of comestibles such as potatoes, with direct passage of electric current in an electrolyte.

It is known to treat organic substances, such as foodstuffs, with direct passage of electric current in an electrolyte, e.g. in the boiling of potatoes where the chief advantage gained is that of a considerably reduced preparation time.

The aim of the present invention is to further develop this technique. The method according to the invention is distinctive in that the electric characteristics of the current passage processing, e.g. the voltage applied, are varied during the processing period. In this way, the great advantage gained in the processing of substances, particularly the preparation of foodstuffs, is that the processing may be adapted not only for different substances by varying the processing time but also for optimising in time its current-voltage characteristics for each substance and each desired type of processing.

It has been proved advantageous in certain types of processing to effect said processing with voltage which decreases during the processing. In this way, two essential advantages are obtained in e.g. the boiling of potatoes. The higher voltage applied in the initial stage results in greater power input to the electrolyte and the potatoes so that heating to the preparing temperature occurs rapidly. Subsequent preparation is carried out with lower applied voltage. This means that the power is reduced so that the temperature is maintained at an attained level without the acute boiling away of the electrolyte. A second, exceedingly important advantage with the voltage variation is that basically only the core of the potatoes is affected during the initial stage when the voltage applied is high, while the outer layer is only minimally affected. Therefore, the outer layer still has good mechanical resistance and is well able to withstand possible stresses from conveying means etc. In a subsequent processing stage, the middle layers of the potatoes can be prepared at a somewhat reduced voltage. The temperature of the electrolyte has now increased so that preparation of the outer layer also commences. The preparation of the outer layer can be completed in the final processing stage when the temperature of the electrolyte has risen, e.g. to 90°–100° C, the voltage applied being considerably reduced.

With this procedure, optimum preparation is attained in a short processing time, without the electrolyte boiling away unnecessarily or the potatoes being boiled to decomposition. In contrast to the conventional method for boiling potatoes, it is possible with direct passage of current to overboil the core of the potatoes without preparation of the outer layer being completed.

A further advantage of the process according to the invention is that the main part of the preparation is carried out in a relatively short time, whereafter the final preparation is effected relatively slowly. The tolerance in processing time will thus be greater.

According to a further development of the invention, the above given procedure can also be utilized in the continuous processing of organic substances on a larger scale, e.g. the preparation of comestibles in a foodstuffs plant. This additional development of the invention foresees conveying a number of processing vessels along a processing path comprising individual sections each with different electrical control.

The invention is also directed to a device for effecting the above mentioned method. It is possible with the machine according to the invention to control the current processing individually in each vessel so that a number of different products may be processed simultaneously in their separate vessels.

According to a further aspect of the invention, the electrical characteristics of the processing may be varied by intermittently interrupting the current supply to the electrodes. Using the same voltage and current as with the previously discussed embodiments, the total energy consumption will thus be less for the same processing time. It has been observed that the processing time, e.g. for potatoes, thereby increases to a minor degree only and not at all proportional to to the saving in energy consumed. When current is supplied continuously, a large proportion of the energy is wasted on vaporizing the electrolyte. When the current supply is interrupted intermittently there is no violent boiling in the electrolyte. This also means an additional advantage in that the ventilating problems of the premises are decreased.

According to one embodiment of the invention for the continuous processing of organic products these pass, in turn, several processing stages, the applied voltage being controlled in such a manner that voltage is never supplied simultaneously to all the processing stages. With four stages current may be supplied alternately to two pairs of stages, thereby reducing the required peak power since the load is spread out evenly in time.

The current supply is according to a further feature of the invention interrupted with a frequency of between one and 20 times per minute, preferably about 10 times per minute. In accordance with a further development of the invention the frequency is variable with the aid of a programming device for the current supply.

Figure 2:
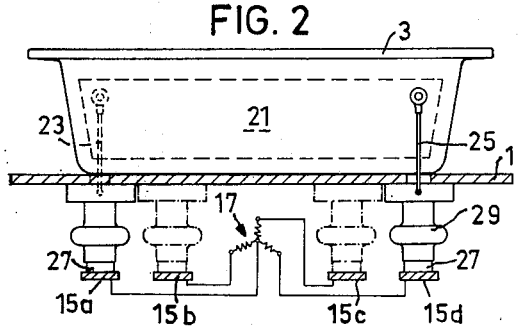
Figure 3:
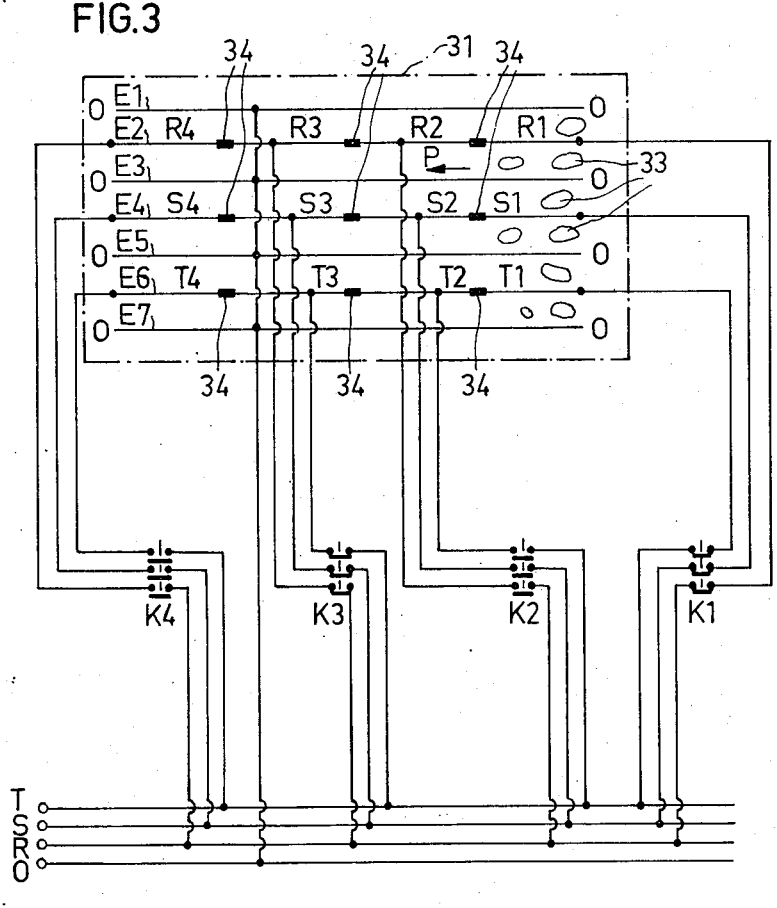
Figure 4:
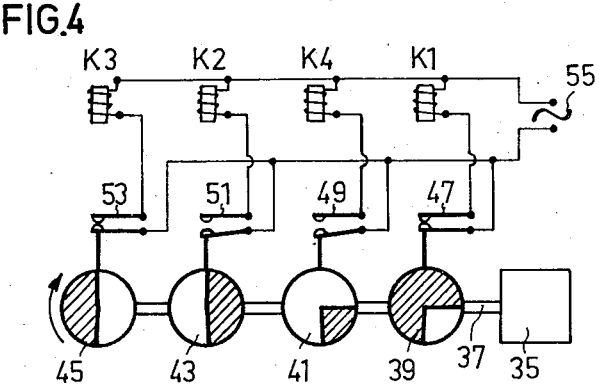

The invention is clarified below with the aid of two embodiments of a machine for the continuous boiling of potatoes. On the enclosed drawings, FIG. 1 is a schematic view of the machine according to a first embodiment, FIG. 2 shows a section along the line II—II in FIG. 1, FIG. 3 schematically shows the current supply arrangement to a machine according to the second embodiment, and FIG. 4 schematically shows a programming device for controlling the current supply arrangement according to FIG. 3.

The machine shown in FIG. 1 comprises a continuous conveyor belt 1 on which a number of trough-shaped vessels 3 are secured. The conveyor belt is driven by wheels 5,7 so that the vessel 3 passes from a filling station 9, where water and potatoes are put into said vessel, to a discharging station which consists of a collecting receptacle 13 connected to the driving wheel 7 of the conveyor belt. Along the conveyor belt strip 11 metal rails 15a–d are arranged to run mutually parallel under the conveyor belt 1. The rails 15 are divided up in longitudinal direction in three sections A, B and C which are electrically separated from each other. As is evident from FIG. 2, the four rails 15a–d are connected with zero and the three phases, respectively, of a three-phase current source 17. This current source preferably comprises a transformer (not shown) and other control means that feed the different rail sections A,B and C with dissimilar voltages, e.g. 220, 160 and 75 V respectively.

The vessel 3 is made of electrically insulating material such as glass or plastics and is provided internally with two electrodes 19 and 21 respectively. These electrodes are connected by electric wiring 23 and 25 resp. with electric contact brushes 27 which bear against the conductor rails and are arranged in brush holders 29 that are attached in the bottom side of the conveyor belt 1. Successive vessels are connected to zero and to successive phases of the current source 17 so that each phase is loaded with an equal number of vessels.

The machine works in the following manner. Proportional amounts of water and raw potatoes are put into each vessel 3 at the filling station 9 as said vessel is being carried past the filling station by the conveyor belt 1. After the filling station, the conveyor belt 1 transports the vessels out on the strip 11 where processing takes place and where the contact brushes 27 connected with the electrodes of the vessels come into contact with the conductor rails 15a–d.

At the first rail section A, a voltage of 220 V is applied between the electrodes so that basically only the center portions of the potatoes are heated up. The water is also heated up gradually. The vessels 3 are conveyed further until they come into contact, via their contact brushes, with section B, at which time the voltage between the electrodes is decreased to 160 V. During this treatment phase the water is heated to 100° C and the whole potato is thereby heated as well. The vessels are finally transported onto the third rail section C and the voltage is reduced to 75 V. This voltage is sufficient to keep the water at, or just below the boiling point. It is only during this stage of the processing that the outer layer of the potato is given final preparation.

The vessels with the fully prepared potatoes are then conveyed further and run over the wheel 7 so that the contents of each vessel are dumped into a collecting receptacle 13 or similar feed-out arrangement.

The continuous conveyor belt 1 then carries the vessels 3 back to the filling station 9 and the procedure is repeated. If desired, the vessels can pass a washing station on their way back to the filling station.

FIG. 3 shows a processing vessel 31 containing electrolyte and seven elongated metal strips E1–E7, which form electrodes. Potatoes 33 are continuously conveyed between the metal strips in the direction of arrow P with the aid of a conveying mechanism, not shown. Potatoes are thus fed to the conveying mechanism at the right hand side of the vessel whereas ready processed potatoes are discharged at the left hand side by means which may be known per se.

The electrodes are connected with a three-phase current supply RSTO in such a manner that the electrodes E1,E3,E5 and E7 are connected with the neutral current supply wire whereas electrodes E2,E4 and E6 are connected each with one phase R,S,T. These three electrodes are also subdivided with the aid of insulator members 34 into each four mutually insulated sections R1–R4, S1–S4 and T1–T4. Current is supplied to these electrode sections from the three phase current supply through relays K1–K4 which are controlled by the programming device shown in FIG. 4.

FIG. 4 shows a motor 35 driving a shaft 37 with variable speed, for example between 1 and 20 RPM. Four cams 39,41,43, 45 are fixed on the shaft. These cams cooperate with each one micro-switch 47,49,51,53 of which switches 47 and 53 are shown closed and switches 49 and 51 are shown open. These switches control the current supply from a current source 55 to each one winding of the relays K1–K4. The cam sectors of these cams are shaped in pairs so that always only two micro-switches are closed at any one time. Current is thus supplied to only two electrode sections at a time whereas the two other electrode sections (for each phase) have no current supplied. This is achieved by shaping the cam sector of the cam 39 to not fully 270° while at the same time shaping the complementary cam sector 41 to not fully 90°. The mutually complementary cams 43 and 45 each have cam sectors of not fully 180°.

In case it is desired, voltage regulating apparatus may be connected between the three-phase source RSTO and the electrode sections. In this way the processing may be regulated by controlling the potential as well as by intermittently interrupting the current supply.

What is claimed is:
1. In a method for heating potatoes, including immersing electrodes in an electrolyte, immersing said potatoes in the electrolyte between, but substantially out of contact with said electrodes, and applying an alternating electrical potential to said electrodes to supply an alternating electric current to said electrodes so that current passes through the electrolyte and said potatoes the improvement comprising lowering, during the processing period and for the entire substance, the rate at which the electrical energy is supplied by the current by irreversibly decreasing from a first to a second potential level both greater than zero, the potential of the applied alternating current.

2. In a method according to claim 1, wherein the current passage processing is divided into a number of stages with different electric energy supplied during each stage.

3. In a method according to claim 1, wherein the step of varying includes decreasing the applied potential as the process continues.

4. In a method according to claim 1, wherein suitable amounts of the substances and an electrolyte are put into a plurality of ve-sels and that the vessels are successively transported by means of a conveying arrangement along a processing strip where the substances in the vessel are subjected to electric current passage processing comprising varying the electric energy supplied along the path of conveyance.

5. In a method according to claim 4, wherein the vessels are provided with inner electrodes which are in contact with the electrolyte in the vessel and which are electrically connected with current collectors accessible from the outside of the vessel, and that said current collectors are brought into contact, during the transporting of the vessel, with current supplying means placed along the path of conveyance.

6. In a method according to claim 5, the vessels are emptied at a feed-out station and are then returned to a filling station by the conveying means.

7. In a method for heating potatoes, including immersing electrodes in an electrolyte, immersing said potatoes in the electrolyte between, but substantially out of contact with said electrodes, and applying an alternating electrical potential to said electrodes to supply an alternating electric current to said electrodes so that current passes through the electrolyte and said potatoes the improvement comprising lowering, during the processing period and for the entire substance, the rate at which the electrical energy is supplied by the current by intermittently interrupting the current supply to the electrodes.

8. In a method according to claim 7, wherein the current supply to the electrode is intermittently interrupted.

9. In a method according to claim 8, wherein the substances in turn pass a plurality of processing stages, the current supply being controlled in such a manner that simultaneous current to all stages is prevented.

10. In a method according to claim 9, wherein the current supply is interrupted at a frequency between 1 and 20 times per minute.

11. In a method according to claim 10, wherein the current supply is interrupted 10 times per minute.

12. In a method according to any one of claim 8, wherein the current supply is interrupted with the aid of a programming device with variable frequency.

* * * * *